United States Patent Office 3,475,794
Patented Nov. 4, 1969

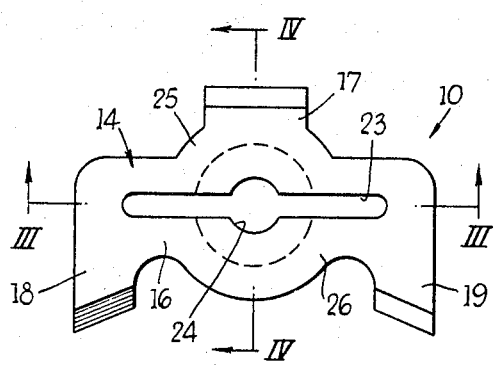
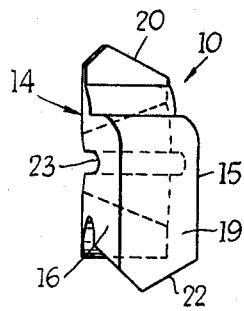
FIG.1    FIG.2
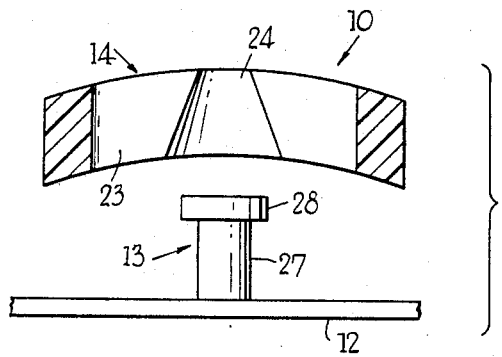
FIG.3
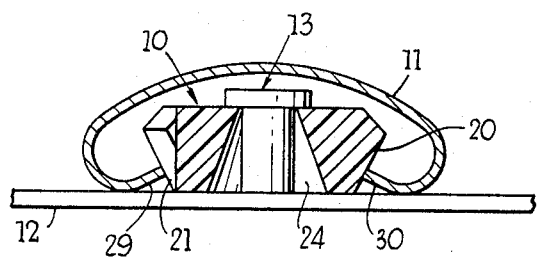
FIG.4

3,475,794
STUD MOUNTED MOULDING FASTENER
Clifford Alexander Seckerson, Iver Heath, England, assignor to United-Carr Incorporated, Boston, Mass., a corporation of Delaware
Filed Feb. 28, 1968, Ser. No. 708,914
Claims priority, application Great Britain, Mar. 3, 1967, 10,305/67
Int. Cl. F16b 5/12
U.S. Cl. 24—73                                 5 Claims

ABSTRACT OF THE DISCLOSURE

The present invention relates to a resilient clip for attaching a moulding to a support surface which is provided with a projecting headed stud. The clip has a body provided with means for clamping the moulding to the support, a tapered bore extending through the body and a slot which passes through the bore and divides the body into two portions which are joined at the ends of the body and which can be deflected when the head of the stud is forced into the tapered bore thereby enabling the head of the stud to snap through the bore and clamp the clip against the support.

---

According to the invention there is provided a resilient clip for attaching an article on a headed stud which projects from a support surface, the clip comprising a body having an undersurface and an upper surface, means on the body for engaging the article, a bore extending through the depth of the body and tapering from the undersurface towards the upper surface and a slot extending along the length of the body and through the bore, the body being divided by the slot into two deflectable portions which are joined at the opposite ends of the body, the deflectable portions being resiliently movable outwardly to allow the head of the stud to be forced through the tapered bore so that the body of the clip is thereafter clamped between the head of the stud and the support surface, and the resilience of the body being such that the stud is thereafter clamped between the said deflectable portions of the body to make a vibration free connection between the clip and the stud.

Preferred forms of the invention are described below with reference to the accompanying drawings in which:

FIGURE 1 is a plan view of a clip according to the invention,

FIGURE 2 is a side elevation of the clip shown in FIGURE 1,

Figure 5:
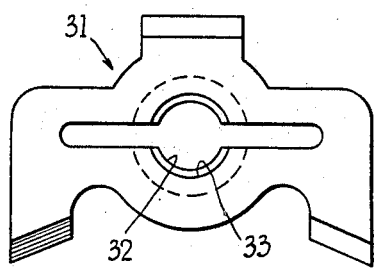
Figure 6:
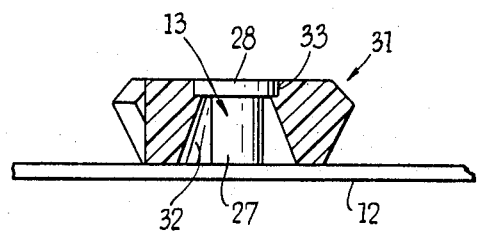
Figure 7:
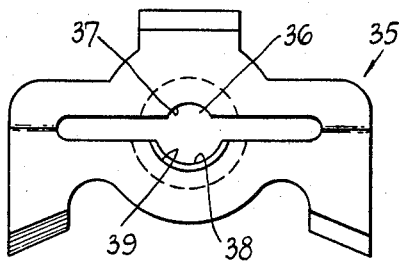
Figure 8:
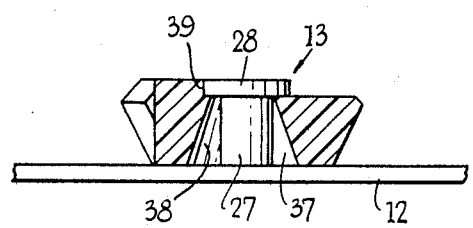

FIGURE 3 is an elevation showing the clip of FIGURE 1, taken in section on the line III—III of FIGURE 1, and a stud on which the clip can be attached, FIGURE 4 is an elevation showing the clip of FIGURE 1, taken in section on the line IV—IV of FIGURE 1, attached to the stud, FIGURE 5 is a plan view of a modification of the clip of FIGURE 1, FIGURE 6 is an elevation, partly in section showing the clip of FIGURE 5 secured to a stud, FIGURE 7 is a plan view of a further modification of the clip of FIGURE 1, and FIGURE 8 is an elevation, partly in section, showing the clip of FIGURE 7 secured to a stud.

In FIGURES 1 to 4, a clip is indicated generally at 10, the clip 10 being adapted for use, as shown in FIGURE 4, to attach a moulding 11 to a support 12 having a stud 13 projecting from its outer surface.

The clip 10 is formed from a synthetic resin, for instance an acrylic resin, and is preferably injection moulded to the shape shown. In its finished form the clip comprises an elongate body 14 which is bowed about its transverse axis so as to have a concave undersurface 15 and a convex upper surface 16. The body 14 includes article engaging means comprising an arm 17 which projects from one side of the body and a pair of spaced arms 18 and 19 which project from the opposite side of the body. The arm 17 has an end face 20 which is undercut and inclined inwardly relative to the undersurface 15 and the arms 18 and 19 have end faces 21 and 22 which are undercut relative to the undersurface and inclined oppositely to the face 20. The body 14 is also provided with a slot 23, which extends along the longitudinal axis of the body and with a central bore 24, which is frusto-conical and tapered from the undersurface 15 towards the upper surface 16 of the body. The slot 23 divides the body into two deflectable portions 25, 26 which are joined at the ends of the body and which are resiliently deflectable to enlarge the width of the bore 24.

The stud 13 to which the clip 10 is attached comprises a cylindrical shank 27, which is welded or similarly attached to the support 12, and which has a diameter which is slightly less than the minimum diameter of the bore 24, and a cylindrical head 28, which has a diameter slightly less than the maximum diameter of the bore 24. The length of the shank 27 is equal to or fractionally greater than the perpendicular distance between the normally concave and convex surfaces of the body 14 of the clip when the body is flattened.

In order to attach the clip 10 to the stud 13 the concave surface of the body 14 of the clip is presented to the head 28 of the stud so that the head enters the bore 24. The clip 10 is then pressed downwardly over the stud and the head of the stud is forced up the tapered bore 24 camming the portions 25, 26 of the body apart until the head of the stud snaps through the bore to overlie the normally convex upper surface of the body. The length of the shank 27 of the stud is such that the body 14 is flattened against the support 12 and is held under permanent stress thus ensuring a firm rattle-free connection between the support and the clip 10 and the resilience of the clip is sufficient to ensure that the shank of the stud is clamped between the two deflectable portions of the body.

The curvature of the body 14 gives a considerable tolerance in the length of the shank of the stud to which the clip 10 is attached.

When the clip 10 is attached to the support 12 the moulding 11, which is formed with inturned flanges 29 and 30 is snap-engaged over the body in a well known manner so that the flange 29 is clamped between the support 12 and the undercut faces 21 and 22 and the flange 30 is clamped between the support and the undercut face 20. Preferably, the flanges 29 and 30 compress the body 14 of the clip slightly and increase the grip of the clip on the stud.

It will be understood that the clip 10 may be modified to attach articles other than a moulding to the support 12.

A modification of the clip 10 is indicated generally at 31 in FIGURES 5 and 6. The clip 31 is similar to the clip 10 except that it has a central bore 32 in the body of the clip which is countersunk to form a cylindrical recess 33 on the convex side of the body to receive the head of the stud. The diameter of the recess 33 is less than the diameter of the head 28 of the stud and thus, as shown in FIGURE 6, the head of the stud is clamped between the side walls of the recess 33 at all times so as to prevent any play between the stud and the clip, even if the resilience of the material from which the clip is made is such that it fails to recover fully after being stretched over the head of the stud.

FIGURE 7 illustrates a clip 35, which is a further modification of the clip 10. The clip 35 is similar to the clip 10 except that it has a central tapered bore 36 one side 37 of which is formed on a smaller radius than the other side 38 and that part of the body surrounding the side 38 of the bore 36 is raised so as to form a cylindrical wall 39, which partly surrounds and is spaced from the bore 36 and acts as an abutment for the head 28 of the stud, as shown in FIGURE 8. The two sides 37 and 38 of the bore 36 and the wall 39 are concentric and the diametrical distance between the side 37 and the wall 39 is less than the diametrical distance from one side of the shank of the stud to the opposite side of the head of the stud. Thus, when the clip 35 is attached to the stud 41 the stud is clamped between the side 37 of the bore and the wall 39 at all times.

It will be understood that both the clip 31 and the clip 35 are used, in the same manner as the clip 10 to attach a moulding to the support 12 and that either clip may be modified to engage articles other than a moulding.

What I claim is:

1. A resilient clip for attaching an article on a headed stud which projects from a support surface, the clip comprising a body having an undersurface and an upper surface, means on the body for engaging the article, there being a bore extending through the depth of the body and tapering from the undersurface towards the upper surface and there being a slot extending along the length of the body and through the bore, the body being divided by the slot into two deflectable portions which are joined at the opposite ends of the body, the deflectable portions being resiliently movable outwardly to allow the head of the stud to be forced through the tapered bore so that the body of the clip is thereafter clamped between the head of the stud and the support surface, and the resilience of the body being such that the stud is thereafter clamped between the said deflectable portions of the body to make a vibration free connection between the clip and the stud.

2. A clip as claimed in claim 1, in which an end of the said bore opening out of the upper surface of the body of the clip is countersunk, thereby forming a cylindrical recess adapted to accommodate the head of the stud, the diameter of the recess, when the clip is unstressed being less than the diameter of the head of the stud.

3. A clip as claimed in claim 2, in which the undersurface of the body is normally concave.

4. A clip as claimed in claim 1, in which a raised cylindrical wall is provided on the upper surface of one of the deflectable portions of the body of the clip, the wall being spaced from and surrounding a part of the said bore opening to act as an abutment for the head of the stud.

5. A resilient clip for attaching a moulding having two longitudinal inturned flanges to a support surface from which a headed stud projects outwardly, the resilient clip comprising a solid body having a planar undersurface and an upper surface, there being a bore extending through the depth of the body and tapering from the undersurface towards the upper surface, there being a slot extending along the length of the body and through the bore, the body being divided by the slot into two deflectable portions which are joined at the opposite ends of the body and which are resiliently movable outwardly to allow the head of the stud to be forced through the tapered bore and which thereafter return to clamp the stud therebetween and at least one moulding engaging arm projecting from each side of the body of the clip for engaging the flanges of the moulding and clamping the flanges against the support surface.

References Cited

UNITED STATES PATENTS

| | | | |
|---|---|---|---|
| 2,358,206 | 9/1944 | Boersma | 85—5 |
| 3,246,440 | 4/1966 | Meyer | 24—73 XR |

DONALD A. GRIFFIN, Primary Examiner

U.S. Cl. X.R.

52—718